United States Patent [19]

Bottazzini et al.

[11] Patent Number: 4,577,010

[45] Date of Patent: Mar. 18, 1986

[54] PROCESS FOR THE PURIFICATION OF POLYPHENYLENE ETHERS

[75] Inventors: Nicola Bottazzini, Milan; Marino Quaglino, Trecate, both of Italy

[73] Assignee: Montedison S.p.A., Milan, Italy

[21] Appl. No.: 689,093

[22] Filed: Jan. 7, 1985

[30] Foreign Application Priority Data

Jan. 9, 1984 [IT] Italy ............................... 19075 A/84

[51] Int. Cl.$^4$ ............................................. C08G 65/46
[52] U.S. Cl. ................................... 528/487; 528/212; 528/214; 528/215; 528/216; 528/217; 528/218
[58] Field of Search ............... 528/486, 487, 502, 212, 528/214-218

[56] References Cited

U.S. PATENT DOCUMENTS

| | | | |
|---|---|---|---|
| 3,994,859 | 11/1976 | Floryan et al. | 528/487 |
| 4,060,514 | 11/1977 | White | 528/487 |
| 4,110,311 | 8/1978 | Cooper et al. | 528/215 |
| 4,237,265 | 12/1980 | Eliassen | 528/487 |
| 4,463,164 | 7/1984 | Dalton et al. | 528/212 |

FOREIGN PATENT DOCUMENTS 3140026  4/1983  Fed. Rep. of Germany .

Primary Examiner—Lester L. Lee

[57] ABSTRACT

Polyphenylene ethers, prepared by oxidative polycondensation of alkylphenols, in the presence of copper-amine catalysts, are decolorized from the reaction by-products and purified from the residues of catalytic copper by treatment, in an acid medium, with one or more thiolic compounds comprised in the general formula.

$$R\text{---}(SH)_n$$

wherein:

n = a whole number ranging between 1 and 6, extremes included

R = an alkyl, an aryl, an alkaryl, an aralkyl, a cycloalkyl, a heterocyclic group, a hydrocarbon radical having several non-condensed benzene rings, optionally substituted by alkyl and/or alkoxy, hydroxy, aminic, sulphonic, carboxylic, nitric, sulphydrilic radicals, halogens.

5 Claims, No Drawings

PROCESS FOR THE PURIFICATION OF POLYPHENYLENE ETHERS

THE PRIOR ART

The polyphenylene ethers and the processes for the preparation thereof, are well known in the prior art, since they are described in numerous publications, such as for instance U.S. Pat. Nos. 3,306,874, 3,306,875 and 4,169,114. The mostly used preparation method, generally consists of a polycondensation of a monovalent phenol dissolved in a suitable organic solvent, for instance toluene or benzene, in the presence of a gas containing oxygen and of a catalytic system consisting of a metal-amine complex, where the metal used is generally copper.

As known, the following operations have to be carried out in order to purify and to isolate the polymer from the reaction mixture. Firstly the catalytic system has to be removed, then it is necessary to start a decoloration of the bulk, that is generally deeply orange-coloured owing to the presence of quinones and of other secondary reaction products; finally the resin has to be isolated by pouring the mixture into a liquid (f.i. methanol) wherein the polyether is insoluble.

The removal of the catalytic system was carried out in various ways, but two of them are chiefly single and efficient: the extraction by means of an acid washing and the use of a suited chelating agent of the metal present in the catalytic system. The acid washing may be carried out both by using mineral acids, such as hydrochloric and sulphuric acid, and simple organic acids such as acetic acid. The chelating agents, which more often are found in the patent literature concerning this subject, are comprised in the group of the polyaminocarboxylic acid and aminocarboxylic acids and respective alkaline salts thereof. However, other compounds are also cited, such as salicyclic acid, 8-oxyquinoline, triethanolamine, 1-4 pentadienone, dipyridyl and cationic resins treated in a suitable way. Recently, to this purpose (German patent application DE-OS No. 3140025) thiolic compounds were proposed as complexing agents of the copper, to be used by direct addition to the basic polymerization mixture.

As to the decoloration, it was obtained by setting numerous processes, which are generally referred to the employment of reducing substances.

Therefore use was made of sulphites, bisulphites, phosphites, hydrosulphites, thiosulphates of various metals in a more or less alkaline medium; hydrazine and its derivatives; various metal-alkyl radicals among which are the alkyls of lithium, sodium, zinc, aluminum, other lithium and sodium-organic compounds and also hydrides, boron hydrides and boron-aluminum hydrides of various metals among which are the lithium, sodium and zinc salts. A particular process described in U.S. Pat. No. 4,169,114 consists in decolorizing the polyoxyphenyl resin, already isolated, by means of an amine under a sufficient pressure. According to German patent application DE-OS No. 3140026, by using the trisodic salt of 1,3,5-triazine-2,4,6-trithiol together with phosphonium salts, a polymer is obtained which, after heating at 280° C. for 30 minutes, is only slightly colored in comparison with the dark brown polymer, obtained under the same conditions by treatment with ethylenediaminetetracetic acid.

THE PRESENT INVENTION

We have now found that it is impossible, in the case of the polyphenylene ethers obtained by oxidative polycondensation of alkylphenols in the presence of copperamine catalysts, to obtain at the same time a substantial decoloration of said polyphenylene ethers, besides an elimination of the catalytic copper up to an amount lower than 10 ppm, if a solution of the polymer, that may be the same mixture coming directly from the polymerization of the alkylphenols, is treated with one or more compounds containing at least a sulphydrylic-SH (thiols) function, as hereinafter defined, in an acid medium.

Such compounds containing at least a sulphydrylic function are comprised in the following general formula:

$$R—(SH)_n \qquad (I)$$

wherein:

$n$ = a whole number ranging between 1 and 6, extremes included;

R may be:

(a) a linear or branched alkyl radical containing from 1 to 16 carbon atoms, which can contain, as substituents in the chain, alkoxy groups having 1-6 carbon atoms, aminic, sulphonic, hydroxy, carboxylic groups, halogens, nitro ($—NO_2$) groups, sulphydrylic ($—SH$) groups in such number as to maintain the value of n no higher than 6;

(b) an arylic, alkylarylic, aralkylic, heterocyclic, cycloalkylic radical, containing altogether from 6 to 16 carbon atoms, optionally comprising substituent groups such as alkyl groups having 1-6 carbon atoms, alkoxy groups having 1-6 carbon atoms, aminic, hydroxy, sulphonic, carboxylic, nitro groups, halogens and sulphydrylic groups, in such number that the value of n does not exceed limit 6;

(c) a hydrocarbon radical containing two or more noncondensed benzene rings, optionaly containing in the benzene rings substituent groups such as halogens, aminic, sulphonic, hydroxylic, carboxylic, nitro groups and sulphydrylic groups in such number that n does not exceed value 6, alkyl and/or alkoxy groups having 1-6 carbon atoms;

(d) a

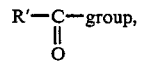

wherein R' may be linear or branched alkyl radical containing from 1 to 16 carbon atoms, optionally containing in the chain, aminic, hydroxylic, sulphonic, nitric, carboxylic, halogen substituent groups, sulphydrylic groups in such number that n does not exceed value 6; or R' may be an aryl, alkylaryl, aralkyl, cycloalkyl, or heterocyclic radical containing altogether from 6 to 16 carbon atoms, which may optionally contain substituents such as alkyl and/or alkoxy groups having 1-6 carbon atoms, halogen atoms, sulphonic, carboxylic, hydroxylic, aminic, nitric groups and sulphydrylic groups in such number that n does not exceed value 6;

(e) a

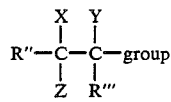

wherein R″=hydroxy group; R‴, X, Y, Z, equal to or different from each other, may represent hydrogen, alkyl and/or alkoxy radicals, having from 1 to 12 carbon atoms, or aryl, arylalkyl, alkylaryl, cycloalkyl, heterocyclic groups, containing from 6 to 16 carbon atoms.

R is preferably an alkyl radical containing from 1 to 12 carbon atoms which present, if possible, in the chain the substituent groups hereinbefore mentioned or it is a radical comprised in one of the following general formulas:

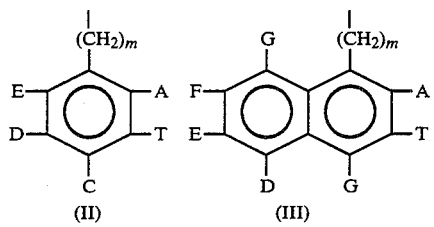

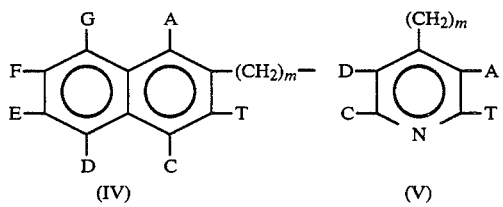

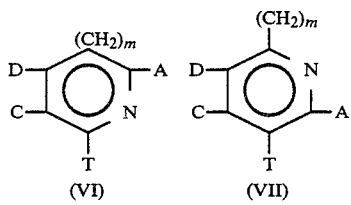

wherein: N=nitrogen, m=a whole number ranging between 0 and 3, extremes included, A, B, C, D, E, F, G equal or different can be hydrogen or halogen atoms, or nitro, aminic, carboxylic, sulphonic, alkyl and/or alkoxy groups containing from 1 to 6 carbon atoms, or sulphydrylic (—SH) groups in such number as to maintain the value of n in formula (I) within limit 6;

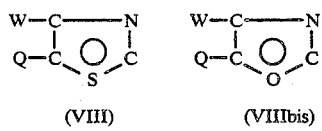

wherein W and Q may be hydrogen atoms or alkylic radicals containing from 1 to 6 carbon atoms, or P and Q together constitute a hydrocarbylic radical forming a chain of 4 carbon atoms condensed with such a heterocyclic nucleus,

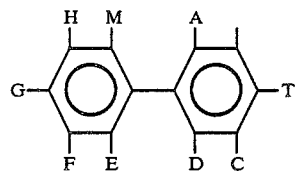

wherein A, T, C, D, E, F, G, H, M equal or different can be hydrogen atoms, or aminic, alkoxy, nitric, sulphonic groups, halogens, alkyl and/or alkoxy groups containing from 1 to 6 carbon atoms, or sulphydrylic groups in such number as to maintain the value of n in formula I within limit 6

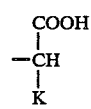

wherein K may be hydrogen, or an alkyl radical containing from 1 to 16 carbon atoms, having a linear or a branched chain, optionally containing substituents in the chain, such as carboxylic and/or aryl, alkylaryl, aralkyl or cycloalkyl groups containing from 6 to 16 carbon atoms or sulphydrylic groups in such number as to maintain the value of n in formula I within limit 6, or K may be a radical of the kind

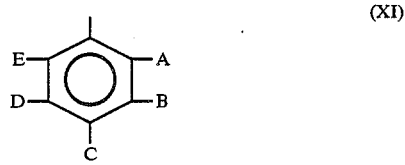

wherein A, T, C, D, E have the meaning assigned hereinbefore for formulas from (II) to (VII).

R′ is preferably an alkyl radical containing from 1 to 12 carbon atoms, optionally containing in the chain the substituent groups hereinbefore mentioned for R′, or it is a cycloalkyl or heterocycle radical, or it is a radical comprised in the following general formula:

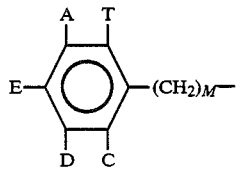

wherein m=a whole number ranging between 0 and 3, extremes included, and A, T, C, D, E have the meaning expressed in formulas from II to VII.

Object of the present invention is therefore the process for the purification of polyphenylene ethers, obtained by oxidative polycondensation of alkylphenols in the presence of copper-amine catalysts, which consists in treating a solution of the polymer with one or more compounds comprised in the general formulas, hereinbefore described, in an acid medium.

The polyphenylene ethers, the process of the present invention refers to, are comprised in the general formula

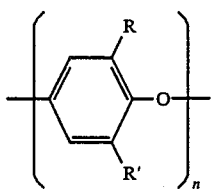

wherein the oxygen of a unit is bound to the benzene nucleus of the subsequent unit and n is a number equal at least to 50; R and R' are monovalent substituents selected among hydrogen, halogens, alkyl radicals, haloalkyl radicals having at least two carbon atoms between the halogen atom and the benzene nucleus.

The preferred polyphenylene ether is poly(2,6-dimethyl-1,4-phenylene)ether.

Examples of compounds containing at least a sulphydrylic function, comprised in general formula (I) and in particular in narrow general formulas from (II) to (VII) are thiophenol, 2-aminothiophenol, benzyl mercaptan, 2-naphthylmercaptan, 2-mercapto-benzoic acid, thiobenzoic acid, 2,4-dichlorobenzenthioglycolic acid, 2-mercaptopyridine, thioacetic acid, thiomalic acid, thiolactic acid, cysteine, thioglycolic acid, 2-mercaptoethanol, ethanethiol, 2-propanethiol, 1-octanethiol, 1-dodecanethiol, t.butylthiol 1,3-propanedithiol, 1,2-ethanedithiol, 1-butanedithiol, 1,3-dimercapto-2,2-pentamethylenpropane, 2,2'-thiobiseptanol, 1,1'-thiobis-2-propanethiol, dimercaptophenol, 2-oxy-trimercaptonaphthalene, trimercaptoaniline, B-amino-naphtalide of thioglycolic acid, trimercapto-s-triazine.

Examples of sulphydrylic compounds, comprised in particular in narrow general formula (VIII) are mercaptobenzothiazole, mercaptobenzooxazole.

Examples of compounds comprised in narrow formula (IX) are 0,0'-dimercapto benzidine, 0,0'-dimercapto-o-tolidine, 0,0'-dimercapto-o-dianisidine.

The amount of thiol used in the process of this invention can vary within very large limits. Generally, such amount has to be related to the one of the polyphenylic ether to be treated and more particularly to the more or less accentuated presence of quinones and other secondary colored products, as well as to the amount of metal, generally copper, to be removed, contained in the catalytic complex employed in the polymerization reaction.

Generally a satisfactory elimination of copper and decoloration is already obtained with 0,5 parts by weight of thiol per 100 parts of polymer.

As to the maximum values of thiol to be used, granted that an excess of such an agent is generally not harmful but, on the contrary, it accelerates and renders more complete the action of the agent itself, no purification parameter undergoes any improvement over a certain threshold of quantity. Such threshold can be set within the value of 50 parts of thiol per 100 parts of polymer, with preferred values comprised between 2 and 20.

The purification process of polyphenylene ether, or of reaction mixtures containing the polyphenylene ether, according to the present invention, consists in bringing the polyether and the thiol into contact with each other under such conditions as to obtain the most favorable results from the point of view of decoloration and removal of the metal present in the catalytic complex.

Such conditions, to be specified, relate especially to the reaction medium and then to the contact time and temperature between thiol and polymeric mixture.

As to the first condition, one states that thiol has to be reacted in an acid medium. The pH of the possible aqueous extract, obtained from the reaction mixture, can vary within large limits depending also on the intrinsic acidity of thiol itself which is added; however it generally ranges between 0 and 6.

The decoloration reaction is favored by the presence, in traces as well, of polar liquids, such as water, alcohols, etc., that may be the same liquids which, such as the water, form during the polymerization reaction, or which, such as the alcohols, are used to separate the polyphenylene ether from the polymerization mixture.

Therefore, for carrying out the invention, it is essential to render acid the reaction medium and, to this purpose, more easily use can be made of the aqueous diluted solutions of mineral acids, such as hydrochloric, sulphuric, phosphoric acid and of the ones of simple organic acids such as acetic acid. Acids can be also used having in their molecule a sulphydrilic function, such as for instance thioglycolic, thiolactic, thiomalic acid. In these cases, when a sufficient amount of them is used, they can act at the same time as acidifying and purifying agent. In general, however, the two agents are distinct and we can choose to add them to the polymeric mixture contemporaneously with only one aqueous solution or one after the other: at first the acid and then the thiol or vice versa. The acidification can be even considered as a quite apart operation and it can be carried out separately.

Then the subsequent contact between thiol and polymeric mixture is carried out after having extracted from said mixture the aqueous phase containing the acid. In this case, the thiol may be added, either alone, or together with the acidifying agent in only one aqueous solution or separately in one of the two possible addition orders.

As to the contact time and temperature, they result to be linked with each other and with the amount of purifying agent which is used, that is to say, by using a large excess of purifying agent, the polymeric mixture is, sometimes, immediately decolorized at room temperature. Generally, the use of long periods of time, of the order of 10–20 hours, favours the employ of low temperatures and the best completion of the purification. However, should the invention be carried out by means of a process using temperatures ranging between 20° and 90° C. in a container optionally provided with a reflux cooler and under a strong stirring, the mixture purification is generally satisfactory with contact times ranging between a few minutes and not more than a few hours, depending also on the kind and on the amount of the used thiolic reactant.

The process can be carried out as well, by effecting, after treatment of the polymeric mixture with thiol in an acid medium (during which both decoloration phenomenon and complexation of copper as insoluble product take place) an alkalinization of the reaction medium up to a pH higher than 7, thereby obtaining the dissolution of the formed copper complex and therefore making the subsequent separation from the polymer easier.

The process object of the present invention has the advantage, in comparison to the ones of the prior art, to utilize only one agent, that simultaneously removes the catalyst metal and decolorizes the polymer by means of an acid treatment generally of mild nature. This is in sharp contrast with the method described in DE-OS No. 3140025, according to which, by using a thiolic derivative in a basic solution, such as the aminic one, coming from the polymerization reaction, no decoloration of polyphenylene ether (or of the reaction mixture containing such a polyether) can be obtained.

The following examples will illustrate the process of the present invention, without limiting, however, its scope.

Such examples refer to the purification of poly-(2,6-dimethyl-1,4-phenylene) ether prepared by oxidative polycondensation of the monomer in the presence of copper-amine catalysts.

In the examples, all the parts and the percentages are based on the weight, unless otherwise specified. The polymer color is valued by measuring the percent of transmission at 425 nanometers of a solution at 2% in chloroform.

To carry out such a measure use was made of a spectophotometer Beckman DU having cells which were 1 cm thick. The higher the transmission percent, the lower the color in the resin. The color number of the polymer is calculated as ((100 - % transmission)10)

CONTROL EXAMPLE

A polymerization catalyst was prepared by adding 16.5 g of n-butylamine, dissolved in 50 cc of toluene, to a solution consisting of 0.615 g cupric bromide in 4 cc of methanol. Such a catalyst was introduced, together with 320 cc of toluene into a reactor having the capacity of 1 l, provided with a cooling jacket, a strirrer, a reflux cooler and inlet pipe for oxygen. The mixture was stirred at a speed of 1500 r.p.m. then oxygen was introduced at a speed of 28.38 l/h. Contemporaneously, in a period of time of 55 minutes, a solution of 140 g of 2.6-xylenol in 160 cc of toluene, was fed into the reactor, through a pump.

Then 50 cc of additional toluene were added into the reactor through the pump. The temperature was kept at 30° C.; after an hour, it was increased to 40° C. and the oxygen flow was lowered down to 3.6 l/h.

After two hours from the reaction start, the mixture was diluted with toluene, so that its content in polyphenylene ether was equal to 10%. the pH of the aqueous extract of such a mixture ranged between 9.5 and 10. such a mixture, non treated with acetic acid, was poured into methanol in order to precipitate the polymer, that was then filtered, washed and dried at 80° C. and 40 mm Hg. The polymer analysis gave the following results: color number=10, residual copper content=1200 ppm. The obtained polymer amounted to about 139.5 g.

EXAMPLES 1-15

Use was made of the reaction mixture, prepared and diluted with toluene, as described in the control example. In each example, 100 g of such a mixture were treated with 20 g of an aqueous solution containing 10% of acetic acid and such an amount of thiolic compound as to have a thiol/polymerized alkyl phenol molar ratio equal to 0.05. The pH of the aqueous phase after acidification was equal to 4. The treatment was carried out under stirring for 15 minutes at constant temperature in a container provided with reflux. The separation of the phase was obtained by centrifugation at 3000 r.p.m. for 15 minutes or by filtration and then decantation in a separatory funnel. The toluenic phase was poured, under stirring, into methanol, in order to precipitate the poly(2.6-dimethyl-1.4phenylene) ether, that was then filtered, washed and dried at 80° C. and 40 mmHg.

The single examples, with the obtained results, relating to the residual copper content and to the color number of the polymer, are recorded on Table I.

EXAMPLE 16

Use was made of 100 g of the polymerization mixture prepared and diluted as in the control example and the procedure was the same of examples 1-15, keeping the treatment temperature constant at 35° C. and separating the phases by filtration and decantation in a separatory funnel, with the difference that the washing solution, instead of consisting of acetic acid and a thiol, consisted of 20 g of an aqueous solution containing 7.55% of thioglycolic acid.

The pH of the aqueous phase, after addition of such a solution was about 3. The polymer thus purified, gave the following results: color number=2.0; residual copper content=3 ppm.

EXAMPLE 17

One worked exactly as in example 16, using, however, 20 g of an aqueous solution containing 8.70 g of thiolactic acid as washing solution. In this case the pH of the aqeous phase was 3.5. The analysis of the polymer thus purified, gave the following results: color number=2.0; residual copper content=10 ppm.

EXAMPLE 18

Use was made of 100 g of the polymerization mixture prepared and diluted as described in the control example and the procedure was the same of examples 1-15, keeping the treatment temperature constant at 35° C. and separating the phase by centrifugation, by using a washing solution consisting of 20 g of an aqueous solution at 2.82% of sulphuric acid and at 1.89% of thioglycolic acid. The ph of the aqueous solution was equal to 1. The analysis of the polymer thus purified, gave the following results: colour number=2.8; residual copper content=2 ppm

EXAMPLE 19

One worked exactly as in example 18, but using, however, 20 g of an aqueous solution containing 2.10% of hydrochloric acid and 1.89% of thioglycolic acid as washing solution. The pH of the aqueous phase was=0.5. The analysis of the polymer thus purified, gave the following results: color number=3.1; residual copper content=2 ppm.

EXAMPLE 20

One worked exactly as in example 18, using, however, an aqueous solution containing 2.82% of sulphuric acid and 2.17% of thiolactic acid as washing solution. The pH of the aqueous phase was=1. The analysis of the polymer thus purified, gave the following results: color number=2.9; residual copper content=5 ppm.

EXAMPLE 21

One worked exactly as in example 18, using, however, 20 g of an aqueous solution containing 3.76% of phosphoric acid and 3.07% of thiomalic acid as washing solution. The pH of the aqueous phase=2. The analysis of the polymer thus purified, gave the following results: color number=2.9; residual copper content=18 ppm.

EXAMPLE 22-26

Use was made of the reaction mixture prepared and diluted with toluene as described in the control example.

In each example, 100 g of such a mixture were treated with 20 g of an aqueous solution containing 10% of acetic acid. After stirring of the bulk for 15 minutes, the separation of the phases was obtained by decantation in a separatory funnel. After removal of the aqueous phase, the toluenic phase, containing a residual dissolved aqueous solution at pH=5, was treated with such an amount of thiolic compound that the thiol/xylenol ratio was equal to 0.05 by moles. The treatment was carried out under stirring for 15 minutes at constant temperature in a container provided with reflux. Then, the whole bulk was poured, under stirring, into methanol, in order to precipitate the poly-(2.6-dimethyl-1.4 phenylene) ether, that was then filtered, washed, dried at 80° C. and 40 mmHg. The single examples, with the obtained results, relating to the residual copper content and to the color number of the polymer, are recorded on Table II.

EXAMPLES 27-33

Use was made of the reaction mixture prepared and diluted with toluene as described in the control example. In each example, 20 g of an aqueous solution containing 10% of acetic acid were added to 100 g of such a mixture. The pH of the aqeous phase was=4. After stirring of the bulk for 15 minutes, the separation of the phase was obtained by decantation in a separatory funnel. After removal of the aqueous phase, the toluenic phase was treated with 20 g of an aqueous solution containing 10% of acetic acid and such an amount of thiol that: thiol/xylenol=0.05 by moles. The pH of the aqueous phase was=3. The treatment was carried out under stirring for 15 minutes at constant temperature in a container provided with reflux.

After separation of the phase by decantation in a separatory funnel and removal of the aqueous phase, the bulk was poured, under stirring into methanol in order to precipitate the poly-(2.6-dimethyl-1.4 phenylene) ether, that was then filtered, washed and dried at 80° C. and 40 mmHg. The single examples with the obtained results, relating the residual copper content and to the color number of the polymer are recorded on Table III.

TABLE II

| EXAMPLE | REACTANT | TREATMENT T (°C.) | COLOR NUMBER | RESIDUAL CU (ppm) |
|---|---|---|---|---|
| 22 | 1-octanthiol | 80 | 2.4 | 6 |
| 23 | Benzyl mercaptan | 60 | 1.6 | 8 |
| 24 | 2-naphtylmercaptan | 35 | 1.8 | 7 |
| 25 | Tert-butyl mercaptan | 50 | 2.8 | 3 |
| 26 | 1-dodecanthiol | 80 | 2.8 | 13 |

TABLE III

| 27 | L-cysteine | 50 | 4.7 | 3 |
|---|---|---|---|---|
| 28 | Thioacetic acid | 50 | 2.1 | 12 |
| 29 | Thioglycolic acid | 35 | 2.2 | 3 |
| 30 | Thiolactic acid | 35 | 2.3 | 3 |
| 31 | 2-mercaptoethanol | 35 | 2.7 | 3 |
| 32 | 2-mercaptobenzothiazole | 60 | 3.1 | 11 |
| 33 | 2-mercaptobenzooxazole | 60 | 3.8 | 12 |

EXAMPLE 34

Use was made of 100 g of the polymerization mixture prepared and diluted according to the control example. One acidified with 20 g of acetic acid at 10% and 0.377 g of thioglycolic acid were added. The pH of the aqueous phase was=4. The mixture was kept under stirring for 15 minutes at 35° C., then an aqueous solution of sodium hydroxide at 1% was added under stirring for 15 minutes at room temperature, thereby obtaining a pH=7.5. The mixture was transferred into a separatory funnel, the aqueous phase was let decantate and then was separated.

The organic phase was precipitated and washed in methanol and the polymer was dried. The copper content was 5 ppm; the color number was=3.

We claim:

1. A process for the purification of polyphenylene ethers, prepared by oxidative polycondensation of alkylphenols by means of copperamine catalysts consisting in treating a solution of the polymer, in an acid medium, with at least one compound comprised in the general formula $$R\text{---}(SH)_n \qquad (I)$$

wherein:
n=a whole number ranging between 1 and 6, extremes included:

TABLE I

| EXAMPLE | REACTANT | TREATMENT T (°C.) | PHASE SEPARATION | COLOR NUMBER | RESIDUAL CU (ppm) |
|---|---|---|---|---|---|
| 1 | Thioglycolic acid | 35 | filtr. and decant. | 2.8 | 3 |
| 2 | Thiomalic acid | 35 | centrif. | 2.8 | 10 |
| 3 | Thiolactic acid | 35 | centrif. | 2.8 | 12 |
| 4 | 2-mercaptoethanol | 35 | centrif. | 2.8 | 3 |
| 5 | Thiophenol | 35 | filtr. and decant. | 4.6 | 16 |
| 6 | 2-mercaptobenzoic acid | 35 | centrif. | 2.7 | 28 |
| 7 | Ethanthiol | 50 | centrif. | 5.3 | 5 |
| 8 | 2-propanthiol | 50 | centrif. | 3.0 | 5 |
| 9 | 2-mercaptopyridine | 80 | centrif. | 1.7 | 17 |
| 10 | 2,4 dichlorobenzene-thioglycolic acid | 80 | centrif. | 3.5 | 10 |
| 11 | 1,3 propandithiol | 35 | centrif. | 2.5 | 6 |
| 12 | 1,2 ethandithiol | 35 | centrif. | 2.8 | 4 |
| 13 | 1-butanthiol | 60 | centrif. | 3.3 | 8 |
| 14 | 2-aminothiophenol | 35 | filtr. and decant. | 2.3 | 24 |
| 15 | Thiobenzoic acid | 60 | centrif. | 1.6 | 22 |

R may be:
(a) a linear or branched alkyl radical containing from 1 to 16 carbon atoms, which can contain, as substituents in the chain, alkoxy groups having 1–6 carbon atoms, aminic, sulphonic, hydroxy, carboxylic groups, halogens, nitro (—NO$_2$) groups, sulphydrylic (—SH) groups in such number as to maintain the value of n no higher than 6;
(b) an aryl, alkylaryl, aralkyl, heterocyclic, cycloalkyl radical, containing altogether from 6 to 16 carbon atoms, optionally comprising substituent groups selected from alkyl groups having 1–6 carbon atoms, alkoxy groups having 1–6 carbon atoms, aminic, hydroxy, sulphonic, carboxylic, nitro groups, halogens and sulphydrylic groups, in such number that the value of n does not exceed limit 6;
(c) a hydrocarbon radical containing two or more non-condensed benzene rings, optionally containing in the benzene rings substituent groups selected from halogens, aminic, sulphonic, hydroxyl, carboxylic, nitro groups, C$_1$–C$_6$ alkyl and/or alkoxy groups and sulphydrylic groups in such number that n does not exceed value 6;
(d) an

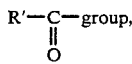

R'—C—group,
∥
O wherein R' may be linear or branched alkyl radical containing from 1 to 16 carbon atoms, optionally containing in the chain, aminic hydroxyl, sulphonic, nitric, carboxylic, halogen substituent groups, sulphydrylic groups in such number that n does not exceed value 6; or R' may be an aryl, alkylaryl, aralkyl, cycloalkyl, or heterocyclic radical containing altogether from 6 to 16 carbon atoms, which may optionally contain substituents selected from alkyl and alkoxy groups having 1–6 carbon atoms, halogen atoms, sulphonic, carboxylic, hydroxy, aminic, nitric groups and sulphydrylic groups in such number that n does not exceed value 6;
(e) an

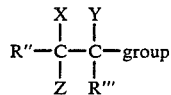

wherein R''=hydroxy group, R''', X, Y, Z, equal to or different from each other, may represent hydrogen, alkyl and/or alkoxy radicals having from 1 to 12 carbon atoms, sulphydrylic, aryl, arylalkyl, alkylaryl, cycloalkyl, heterocyclic groups, containing altogether from 1 to 16 carbon atoms.

2. A process according to claim 1, wherein the polymer solution consists of the mixture coming directly from the reaction of oxydative polycondensation of alkylphenols.

3. A process according to claim 1, wherein R is selected from the group consisting of alkyl radicals containing from 1 to 12 carbon atoms, such alkyl group containing in the chain substituent groups (a) of claim 1, radicals comprised in one of the following general formulas:

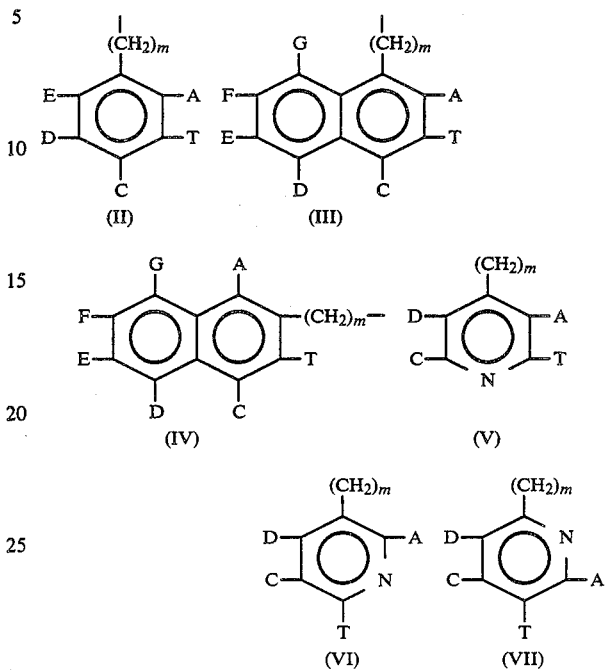

wherein N=nitrogen, m=a whole number ranging between 0 and 3, extremes included, A, T, C, D, E, F, G the same or different are selected from the group consisting of hydrogen, halogen atoms, nitro, aminic, carboxylic, sulphonic, alkyl and/or alkoxy groups containing from 1 to 6 carbon atoms, and sulphydrylic (—SH) groups in such number as to maintain the value of n in formula (I) within limit 6;

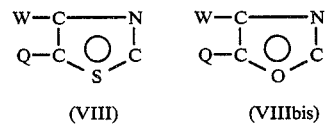

wherein W and Q are selected from the group consisting of hydrogen atoms, and alkylic radicals containing from 1 to 6 carbon atoms, or W and Q together constitute a hydrocarbylic radical forming a chain of 4 carbon atoms condensed with such a heterocyclic nucleus,

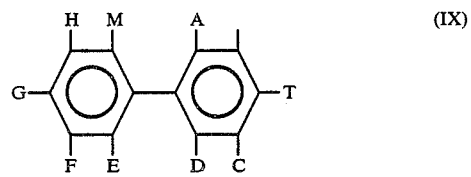

wherein A, T, C, D, E, F, G, H, M the same or different are selected from the group consisting of hydrogen atoms, aminic, carboxylic, nitric, sulphonic groups, halogens, alkyl and/or alkoxy groups containing from 1 to 6 carbon atoms, and sulphydrylic groups in such number as to maintain the value of n in formula I within limit 6

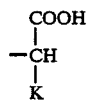 (X)

wherein K is selected from the group consisting of hydrogen, linear or branched alkyl radicals containing from 1 to 16 carbon atoms, such radicals containing in the chain, substituents selected from the group consisting of carboxylic and/or aryl, alkylaryl, aralkyl, cycloalkyl groups containing from 6 to 16 carbon atoms, sulphydrylic groups in such number as to maintain the value of n in formula I within limit 6, and radicals of the formula

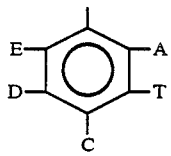 (XI)

wherein A, T, C, D, E have the meaning as in formulas from (II) to (VII).

4. A process according to claim 1, wherein R' is selected from the group consisting of alkyl radicals containing from 1 to 12 carbon atoms, such radicals containing in the chain substituent groups according to (d) of claim 5, cycloalkyl radicals, and heterocyclic radicals comprised in the following general formula:

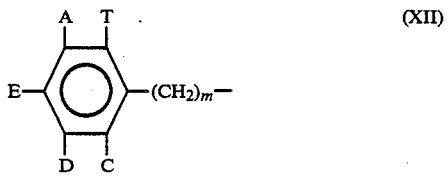 (XII)

wherein m=a whole number ranging between 0 and 3, extremes included, and A, T, C, D, E have the same meaning as in formulas (II) to (VII).

5. A process according to claim 1, in which the purification of the polyphenylene ether is carried out at a temperature of 20° C. to 90° C. and the amount of compound I used is from about 0.5% to 50% by weight based on the polymer weight.

* * * * *